United States Patent [19]

Watkins

[11] 4,196,982
[45] Apr. 8, 1980

[54] SPECTACLE FRAME HAVING SNAP-IN LENSES

[75] Inventor: Willis T. Watkins, Kansas City, Mo.

[73] Assignee: Parmelee Industries, Incorporated, Kansas City, Mo.

[21] Appl. No.: 889,268

[22] Filed: Mar. 23, 1978

[51] Int. Cl.$^2$ .................. G02C 1/00; G02C 9/00; G02C 5/00

[52] U.S. Cl. .................. 351/86; 351/47; 351/154; 2/443

[58] Field of Search .................. 351/41, 47, 86, 83, 351/154, 48, 57, 58; 2/442, 443; 350/257

[56] References Cited

U.S. PATENT DOCUMENTS

| | | | |
|---|---|---|---|
| Re. 16,233 | 12/1925 | Stevens | 351/154 |
| 1,241,716 | 10/1917 | Day | 351/86 |
| 1,520,977 | 12/1924 | Stevens | 351/86 |
| 1,520,978 | 12/1924 | Stevens | 351/86 |
| 1,520,979 | 12/1924 | Stevens | 351/86 |
| 1,545,529 | 7/1925 | Stevens | 351/86 |
| 1,600,606 | 9/1926 | Stevens | 351/86 |
| 2,276,102 | 3/1942 | Schwartz | 351/86 |
| 2,427,918 | 9/1947 | Malcom et al. | 2/441 |
| 2,918,570 | 12/1959 | Diedring | 350/257 X |
| 3,453,042 | 7/1969 | Cooper | 351/86 |

OTHER PUBLICATIONS

American Optical Publication, Polysnap Lenses (advertising literature, 8/77).

*Primary Examiner*—John K. Corbin
*Assistant Examiner*—Rodney B. Bovernick
*Attorney, Agent, or Firm*—Schmidt, Johnson, Hovey & Williams

[57] ABSTRACT

A plastic frame safety spectacle of the type provided with removeable concavo-convex lenses has a variable-depth lens channel formed in the respective plastic rims, each channel being configured to complementally receive a lens periphery whereby the lenses are securely held in position within the rims yet may be removed or replaced using only manual pressure and without requiring heating or other special processing of the frame. Each lens channel is continuous around its respective rim, gradually and progressively becoming deeper as the upper portion of the rim is approached such that maximum restraining is provided for the lenses along the top rims where deformation is most likely to occur from twisting or bending of the spectacle frame. The back portion of each rim is provided with a lens-engaging support ledge to preclude removal of the lenses from the backside of the frame thereby seating the lenses against dislodging by frontal impact.

4 Claims, 10 Drawing Figures

4,196,982

SPECTACLE FRAME HAVING SNAP-IN LENSES

BACKGROUND

This invention relates to safety spectacles in general and particularly concerns an improved plastic frame for such spectacles wherein the lenses are securely retained in accordance with accepted safety standards yet may be removed and replaced using only manual pressure and without the need for special processing techniques.

Safety spectacles have long been used in industrial environments to protect workers from serious eye injuries. With the recent enactment of comprehensive federal legislation regarding safe working environment, use of safety spectacles has significantly increased.

It will be appreciated that the provision of safety glasses for workers amounts to a considerable expense which must be born in every case by the employer. In the interest of alleviating this financial burden somewhat, relatively inexpensive plastic frame safety glasses have met with wide acceptance.

A problem with safety spectacles in general, and plastic frame glasses in particular, is that the lenses frequently become severely pitted or scratched after only a short period of use due to the oftentimes severe environment to which the safety glasses are subjected. In addition to impairing visibility, such pitting and scattering may weaken the lens to the point where it is no longer able to meet impact requirements set for safety-type lenses. Hence, continued use of safety spectacles having worn lenses may be detrimental to the safety of the worker in addition to being annoying from the standpoint of reduced vision.

Again in the interest of reduced expenses, it is common practice to replace worn lenses in plastic frame safety spectacles as necessary rather than simply discarding the entire spectacle. However, heretofore lens replacement has proved particularly difficult and in some instances the frames are returned to the manufacturer for replacement of the lenses. This for the reason that plastic frames should be heated in order to install new lenses and special care must be taken to assure that the new lenses are properly seated to provide a safe spectacle. In this latter regard, improper installation of safety lenses by unskilled personnel may result in a lens which is subject to being dislodged upon impact such that the wearer is not adequately protected by the safety spectacle.

Replacement of safety spectacle lenses has proved troublesome and expensive for employers who provide safety glasses to their employees. Of course the fact that skilled labor is required to replace the lenses is in itself a significant factor in the expense of maintaining safety spectacles. Moreover, in instances where the employer returns the safety glasses to the factory for lens replacement, he must necessarily have an additional supply of safety spectacles to be used during times when others are at the factory for lens replacement.

SUMMARY OF THE INVENTION

In order to overcome the aforementioned problems with plastic frame safety spectacles, the present invention is concerned with a spectacle frame having unique lens-retaining means whereby the lenses are normally held securely in place in accordance with required safety standards yet may be removed and replaced using only manual pressure.

The rims respectively circumscribing each lens are provided with unique vairable depth lens channels which releasably engage the lenses for the purpose of securely retaining them in position within the plastic frame. The depth of each lens channel progressively and gradually increases from a minimum depth at the lowermost portion of the rim to a maximum depth at the diametrically opposed uppermost portion of the latter. This construction in combination with the inherent plastic memory of the frame permits the lenses to be snapped into position and then be securely retained around the full lens periphery. Maximum retaining force is presented at the uppermost portion of the rim where dislodging forces are most likely to be encountered upon bending or twisting of the frame.

Additionally, there is provided at the back side of each rim a support ledge adapted to engage the lenses thereby precluding removal of the lens from the backside of the frame. In this manner, the lens is rendered resistant to dislodging from frontal impact, an important requirement for safety spectacles.

DETAILED DESCRIPTION OF THE INVENTION

Figure 1:
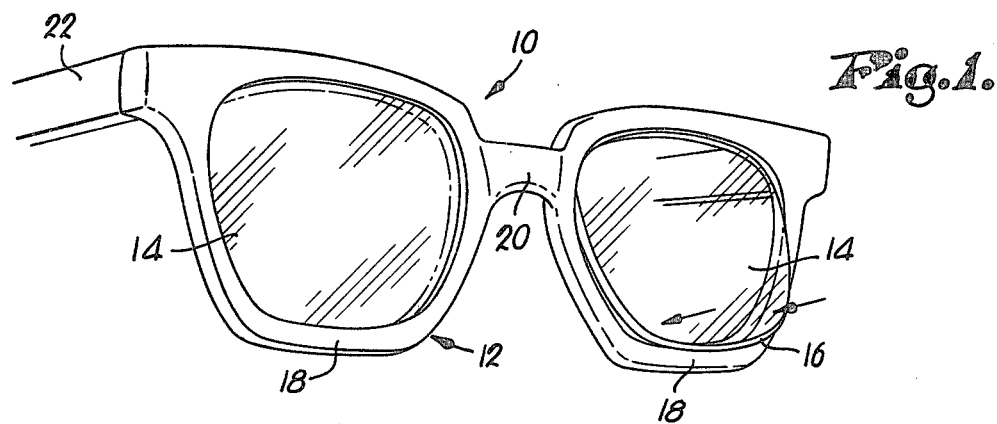
FIG. 1 is a perspective view of a safety spectacle frame having snap-in lenses and constructed in accordance with the principles of the present invention.

In FIG. 1 there is illustrated a safety spectacle 10 including a plastic frame 12 and a pair of concavo-convex safety lenses 14 releasably mounted in the frame 12. The spectacles 10 are in all respects in compliance with accepted standards for safety glasses, differing from conventional safety spectacles only with regard to the details of construction discussed hereinbelow.

Figure 3:
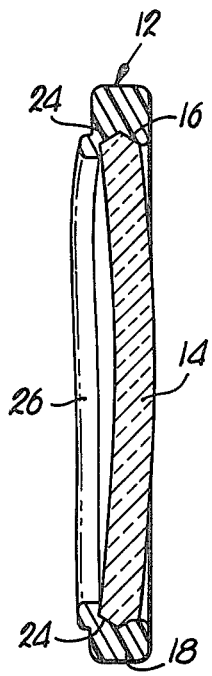
FIG. 3 is an enlarged cross-sectional view taken along line 3—3 of FIG. 2.

The lenses 14 have a conventional double-bevel, generally annular periphery 16, the included angle of the bevel being 115°. The shape of the lens 14 shown in the drawings conforms to the S-7 shape as defined in Federal Specification GGG-S-620B, though it is contemplated that any desired shape of lens may be used in the present invention. By virtue of the S-7 shape of the lenses 14, together with their concavo-convex configuration, each periphery 16 defines a three-dimensional curve as shown for example in FIG. 3. Lenses 14 are preferably constructed of polycarbonate material but any other suitable safety lens material such as tempered glass might be used as well.

The frame 12 includes a pair of generally annular rims 18 each defining an opening for receiving a respective lens 14, a nose bridge 20 intercoupling the rims 18 in spaced coplanar relation, and a pair of ear-engaging elongate temples 22 each pivotally mounted to a respective rim 18 adjacent the top of the latter for the purpose of supporting the spectacle 10 on the user. The ophthalmic mounting or frame 12 is preferably constructed of a rigid resinous material exhibiting plastic memory as are well known in the art of plastic frames.

Each rim 18 is provided with a continuous lens channel 24 circumscribing the lens-receiving opening presented by the rim 18 for the purpose of engaging the double-bevel periphery 16 in a manner to secure the lens 14 to the frame 12. The lens channels 24 are configured to complementally receive the respective lens peripheries 16, each having a V-shaped cross section and defining a three-dimensional curve similar to that presented by the peripheries 16. In this manner, when the lenses 14 are mounted within respective channels 24, the full periphery 16 of each lens 14 is securely engaged by the rim 18 without imposing undesirable bending stresses in the frame 12. This is in direct contrast to the construction of most conventional safety glasses wherein the lens channel is disposed within a single plane.

An important feature of the present invention is the fact that the channels 24 are of variable depth. When the rims 18 are disposed in their normally upright position as shown for example in FIG. 2, it can be seen that the depth of the channel 24 progressively and gradually increases from a minimum depth at the lowermost portion of the rim 18 to a maximum depth at the uppermost portion thereof.

Figure 2:
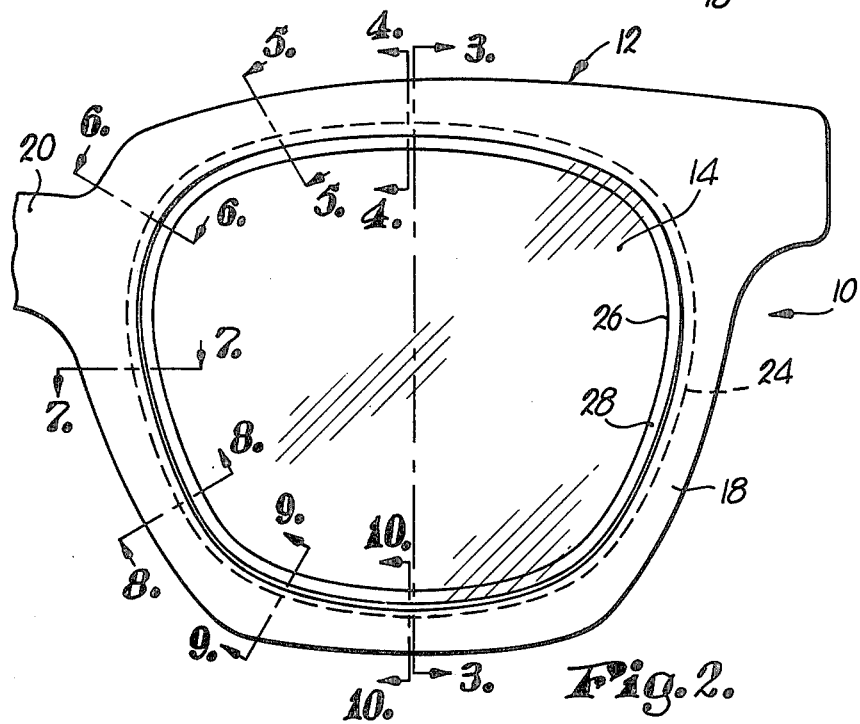
FIG. 2 is an enlarged, front elevational view showing one rim of the frame in supporting engagement with a respective lens.
Figure 4:
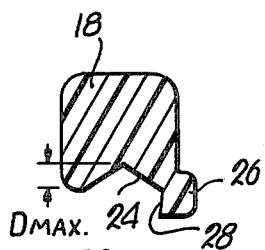
FIG. 4 is an enlarged cross-sectional view taken along line 4—4 of FIG. 2.
Figure 5:
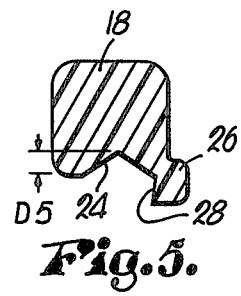
FIG. 5 is an enlarged cross-sectional view taken along line 5—5 of FIG. 2.
Figure 6:
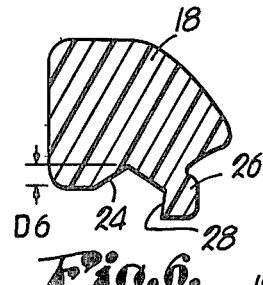
FIG. 6 is an enlarged cross-sectional view taken along line 6—6 of FIG. 2.
Figure 7:
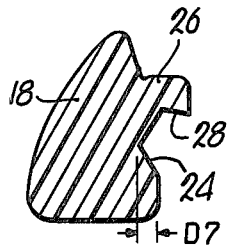
FIG. 7 is an enlarged cross-sectional view taken along line 7—7 of FIG. 2.
Figure 10:
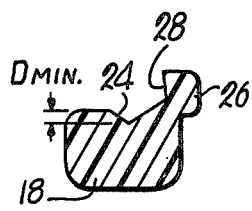
FIG. 10 is an enlarged cross-sectional view taken along line 10—10 of FIG. 2.
Figure 9:
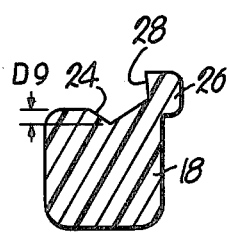
FIG. 9 is an enlarged cross-sectional view taken along line 9—9 of FIG. 2.
Figure 8:
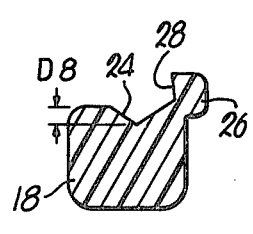
FIG. 8 is an enlarged cross-sectional view taken along line 8—8 of FIG. 2.

Considering now FIGS. 4–10, the depth D of the channel 24, as measured at the forward edge of the latter, varies from a typical D max. of 0.040 inches in FIG. 4 to a D min. of 0.020 inches in FIG. 10. The gradual change in depth D between the cross section shown in FIG. 4 and that shown in FIG. 10 is illustrated in FIGS. 5–9 wherein D5 equals 0.039 inches, D6 equals 0.037 inches, D7 equals 0.033 inches, D8 equals 0.027 inches, and D9 equals 0.021 inches. Moreover, the values for depth D at similar locations extending counter-clockwise around the rim 18 from line 10—10 to line 4—4 as shown in FIG. 2 correspond to the depth values D shown in FIGS. 5–9. That is to say, when progressing around the channel 24 in a counterclockwise direction from line 4—4 in FIG. 2, the depth values D gradually decrease until D min. at line 10—10 is reached whereupon the depth values D gradually increase to D max. at line 4—4. It is to be noted that the double-bevel periphery 16 of each lens 14 has an apex which is spaced approximately 0.040 inches from its base which substantially corresponds to D max. at line 4—4 in FIG. 2.

The back surface of each rim 18 (i.e. the surface normally facing toward the wearer) is provided with a raised support ledge 26 circumscribing and partially obstructing the lens-receiving opening defined by the rim 18. Each ledge 26 presents a forwardly facing retainer surface 28 of a configuration to engage the outer margin of the rear viewing surface of a respective lens 16 thereby precluding removal of the lens 16 through the backside of frame 12. Hence, the lenses 14 are rigidly secured against dislodgement by a frontal impact such as might be encountered during normal use of the safety spectacle 10.

With the exception of lens replacement, the safety spectacle 10 is functionally similar to and essentially the equivalent of conventional safety glasses. The spectacle 10 may be used in any industrial application requiring non-corrective eye protection.

When lenses 14 become excessively pitted or scratched from normal use or otherwise, it is but a simple matter to replace the lenses 14 in accordance with recommended safety practices. In this regard, the worker himself or safety crib operator simply grasps the frame 12 and manipulates the latter to apply thumb pressure on the back surface of one lens 14 adjacent the lowermost portion of its respective rim 18. By virtue of the reduced depth D at this location, the lower portion of periphery 16 is dislodged from engagement with the lens channel 24 thereby permitting the remainder of the periphery 16 to be similarly removed from engagement with the latter and hence allowing the lens 14 to be removed from the opening defined by rim 18. Of course, the other lens is similarly removed and both lenses are discarded.

Of course, the above mentioned procedure is simply reversed when new lenses 14 are inserted into the openings defined by rims 18. The uppermost edge of the lens 14 is initially disposed within the uppermost, deep portion of the channel 24 from the front of the frame 12. Next, manual pressure is applied to the front surface of the lens 14 adjacent the lowermost portion of the rim 18 in order to force the lens 14 into snug engagement with the channel 24 along the full periphery 16.

In view of the foregoing, it is clear that the present invention offers a significant improvement over safety spectacles heretofore available. The variable depth feature of the lens channel 24 permits use of a concavo-convex lens 14 having a standard double-bevel periphery such as 16 yet at the same time allows for lens replacement using only manual pressure. The unique three-dimensional curve of lens channel 24 conforming to the curve defined by periphery 16 of lens 14 imparts maximum holding force to the lens 14 thereby greatly reducing the likelihood that the latter may become accidentally dislodged due to bending or twisting of the frame 12. Moreover in this regard, the fact that the deepest portion of the channel 24 is disposed along the uppermost portion of the rim 18 also reduces the likelihood of unintentional removal of the lens 14 inasmuch as this construction provides maximum holding power in the very area most susceptible to deformation by bending or twisting of the frame 12.

What I claim is:

1. An ophthalmic mounting for an optical lens having a V-shaped periphery, comprising:
   a generally annular rim defining a lens-receiving opening and formed of a yieldable material exhibiting plastic memory;
   said rim being configured to present a continuous lens channel defined by respective, continuous, front and rear wall surfaces which are obliquely oriented relative to one another such that said channel is generally V-shaped in cross-section,
   the height of said near wall surface being substantially constant for substantially equally supporting said lens around the periphery thereof and minimizing the possibility of inadvertent rearward removal of the lens from said mounting,
   the height of said front wall surface progressively decreasing from a maximum at a first point on said channel to a minimum at a second point on said channel generally opposed to said first point for permitting manual insertion and removal of said lens from the front of said mounting.

2. The mounting as set forth in claim 1 including structure defining a continuous, peripheral support ledge adjacent said near wall for providing additional support against said inadvertent rearward removal of said lens.

3. The mounting as set forth in claim 1 wherein said first point is located in the normal top area of said channel, and said second point is located in the normal bottom area of said channel.

4. The mounting as set forth in claim 1 wherein said channel defines a three-dimensional curve.

* * * * *